(12) United States Patent
Jatou et al.

(10) Patent No.: US 12,306,354 B2
(45) Date of Patent: May 20, 2025

(54) INTEGRATED ELECTROMAGNETIC-ACOUSTIC SENSOR AND SENSING

(71) Applicant: AyDeeKay LLC, Aliso Viejo, CA (US)

(72) Inventors: Ross Jatou, San Jose, CA (US); Danny Elad, Kibutz Matzuva (IL); Dan Corcos, Tel Aviv (IL)

(73) Assignee: AyDeeKay LLC, Aliso Viejo, CA (US)

( * ) Notice: Subject to any disclaimer, the term of this patent is extended or adjusted under 35 U.S.C. 154(b) by 0 days.

(21) Appl. No.: 18/426,336

(22) Filed: Jan. 30, 2024

(65) Prior Publication Data

US 2024/0192344 A1  Jun. 13, 2024

Related U.S. Application Data

(63) Continuation of application No. 17/187,251, filed on Feb. 26, 2021, now Pat. No. 11,914,081.

(51) Int. Cl.
| | |
|---|---|
| *G01S 7/521* | (2006.01) |
| *B06B 1/02* | (2006.01) |
| *B06B 1/04* | (2006.01) |
| *G01S 7/52* | (2006.01) |
| *G01S 15/04* | (2006.01) |

(Continued)

(52) U.S. Cl.
CPC ............ *G01S 7/521* (2013.01); *B06B 1/0292* (2013.01); *B06B 1/04* (2013.01); *G01S 7/52079* (2013.01); *G01S 15/04* (2013.01); *G01S 15/523* (2013.01); *G01S 15/931* (2013.01)

(58) Field of Classification Search
CPC .... G01S 7/521; G01S 15/931; G01S 7/52079; G01S 15/04; G01S 15/523; G01S 7/5203; B06B 1/04; B06B 1/0292

USPC ......................................................... 73/632
See application file for complete search history.

(56) References Cited

U.S. PATENT DOCUMENTS

| | | |
|---|---|---|
| 8,770,031 B2 | 7/2014 | Brady |
| 2011/0260576 A1 | 10/2011 | Masaki |

(Continued)

FOREIGN PATENT DOCUMENTS

WO   2009023678 A2   2/2009

OTHER PUBLICATIONS

Measured Radio Frequency Emissions from Delphi L2C0051TR, Sep. 12, 2012 (Year: 2012).*

(Continued)

*Primary Examiner* — John Fitzgerald
*Assistant Examiner* — Rose M Miller
(74) *Attorney, Agent, or Firm* — Steven Stupp

(57) ABSTRACT

One illustrative integrated electromagnetic-acoustic sensor includes: a ground plane; a patch antenna above the ground plane to send or receive an electromagnetic (EM) signal having an EM signal frequency; and an array of capacitive micromachined acoustic transducers formed by cavities between the patch antenna and a base electrode to send or receive an acoustic signal having an acoustic signal frequency. One illustrative sensing method includes: driving or sensing a EM signal between a ground plane and a patch antenna; and driving or sensing an acoustic signal between the patch antenna and a base electrode, the base electrode and the patch antenna having an array of capacitive micromachined acoustic transducer cavities therebetween.

20 Claims, 11 Drawing Sheets

(51) Int. Cl.
  *G01S 15/52* (2006.01)
  *G01S 15/931* (2020.01)

(56) References Cited

U.S. PATENT DOCUMENTS

2013/0214918 A1* 8/2013 Schumann ............ G01S 13/582
  340/435
2019/0049958 A1* 2/2019 Liu ........................ G01S 17/00

OTHER PUBLICATIONS

CarSonar—WR Datasheet, downloaded Sep. 28, 2024 (Year: 2024).*
MuRata MA58MF14-7N Product Search Data Sheet, downloaded Sep. 28, 2024 (Year: 2024).*
TIDA-00151 Automotive Ultrasonic Sensor Interface IC for Park Assist or Blind Spot Detection Systems, downloaded Sep. 28, 2024 (Year: 2024).*

* cited by examiner

INTEGRATED ELECTROMAGNETIC-ACOUSTIC SENSOR AND SENSING

CROSS REFERENCE PARAGRAPH

This patent application is a continuation of U.S. patent application Ser. No. 17/187,251, titled "INTEGRATED ELECTROMAGNETIC-ACOUSTIC SENSOR AND SENSING," filed on Feb. 26, 2021, the contents of which are hereby incorporated by reference.

BACKGROUND

In the quest for ever-safer and more convenient transportation options, many car manufacturers are developing self-driving cars which require an impressive number and variety of sensors, often including arrays of acoustic and/or electromagnetic (EMO sensors to monitor the distance between the car and any nearby persons, pets, vehicles, or obstacles. Acoustic sensors may offer low cost while struggling to provide long range measurements. EM sensors may offer high accuracy and motion detection while struggling to provide short range detection. The sensors for each technology are may require dedicated exterior surfaces that impose potentially costly limitations on the vehicle design. These limitations, or at least the associated cost impacts, may not be adequately minimized by existing sensor designs.

SUMMARY

Integrated electromagnetic-acoustic sensors and sensing methods are disclosed herein, which may at least partly address the shortcomings identified above. One illustrative integrated electromagnetic-acoustic sensor includes: a ground plane; a patch antenna above the ground plane to send or receive an electromagnetic (EM) signal having an EM signal frequency; and an array of capacitive micromachined acoustic transducers formed by cavities between the patch antenna and a base electrode to send or receive an acoustic signal having an acoustic signal frequency.

One illustrative sensing method includes: driving or sensing a EM signal between a ground plane and a patch antenna; and driving or sensing an acoustic signal between the patch antenna and a base electrode, the base electrode and the patch antenna having an array of capacitive micromachined acoustic transducer cavities therebetween.

An illustrative obstacle detector includes: a radar transceiver coupled to supply an EM transmit signal to an EM node of a first integrated electromagnetic-acoustic sensor, and coupled to obtain an EM receive signal from an EM node of a second integrated electromagnetic-acoustic sensor, the EM receive signal potentially having reflections from obstacles within a radar range of the detector; an acoustic transceiver coupled to supply an acoustic transmit signal to an acoustic input of the first integrated electromagnetic-acoustic sensor, and coupled to obtain an acoustic receive signal from an acoustic output of the second integrated electromagnetic-acoustic sensor, the acoustic receive signal potentially having reflections from obstacles within an acoustic range of the detector, the acoustic range including shorter distances than the radar range; and a controller coupled to the radar transceiver and the acoustic transceiver to obtain reflection measurements and to combine the reflection measurements to determine a distance to a nearest obstacle.

The illustrative sensor, sensing method, and detector, may be employed individually or conjointly, together with one or more of the following optional features in any suitable combination: 1. first and second differential signal nodes to convey the acoustic signal to or from the sensor; a first filter that couples the first differential signal node to the patch antenna; and a second filter that couples the second differential signal node to the base electrode, the first and second filters configured to pass the acoustic signal frequency while blocking the EM signal frequency. 2. the first filter couples the first differential signal node to the patch antenna with a first EM frequency choke and couples the first differential signal node to the ground plane with a first capacitor. 3. the second filter couples the second differential signal node to the base electrode with a second EM frequency choke and couples the second differential signal node to the ground plane with a second capacitor. 4. the first and second EM frequency chokes each comprise a quarter-wave microstrip transmission line. 5. the first and second EM frequency chokes each comprise an inductor. 6. the EM signal frequency is 10 GHz or more. 7. the acoustic signal frequency is 1 GHz or less. 8. an EM signal node to convey a radio frequency signal to or from the sensor; and a capacitor that couples the patch antenna to the EM signal node. 9. the patch antenna is separated from the base electrode by no more than 2 microns, and is separated from the ground plane by at least 200 microns. 10. the base electrode lies between the ground plane and the patch antenna. 11. the base electrode is patterned to provide a high impedance surface at the EM signal frequency. 12. additional integrated electromagnetic-acoustic sensors each coupled to the radar transceiver and coupled to the acoustic transceiver, the radar transceiver and acoustic transceiver each configured to perform multiple-input multiple-output reflection measurements. 13. the controller is configured to determine a direction to the nearest obstacle and a relative velocity of the nearest obstacle.

NOMENCLATURE

The use of the terms "approximately" or "substantially" mean that a value of an element has a parameter that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "first", "second", "next", "last", "before", "after", and other similar terms are used for description and ease of reference purposes only and are not intended to be limiting to any configuration of elements or sequences of operations for the various embodiments of the present disclosure. Further, the terms "coupled", "connected" or otherwise are not intended to limit such interactions and communication of signals between two or more devices, systems, components or otherwise to direct interactions—indirect couplings and connections may also occur.

DETAILED DESCRIPTION

The following description and accompanying drawings are provided for explanatory purposes, not to limit the disclosure. That is, they provide the foundation for one of ordinary skill in the art to understand all modifications, equivalents, and alternatives falling within the scope of the claims.

Figure 1:
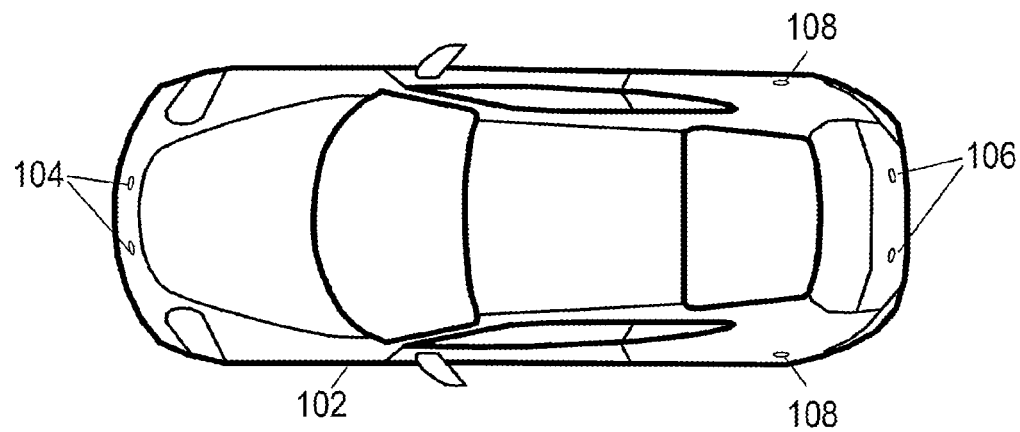
FIG. 1 is an overhead view of an illustrative vehicle equipped with sensors.

FIG. 1 shows an illustrative vehicle 102 equipped with various integrated electromagnetic-acoustic (EMA) sensor arrays, including forward sensor arrays 104 for forward obstacle sensing and rear sensor arrays 106 for rearward obstacle sensing. Side acoustic sensor arrays 108 may be provided for blind spot obstacle sensing. Each of the EMA sensor arrays may combine electromagnetic (EM) and acoustic measurements to provide short, medium, and far range sensing to support multiple driver assistance services including, e.g., park assist, adaptive cruise control, and automated collision avoidance. Each sensor array may perform multiple-input multiple-output (MIMO) sensing to enable obstacle distance and direction determination. The number and configuration of sensors in the sensor arrangement for vehicles having driver-assist and self-driving features varies.

Figure 2:
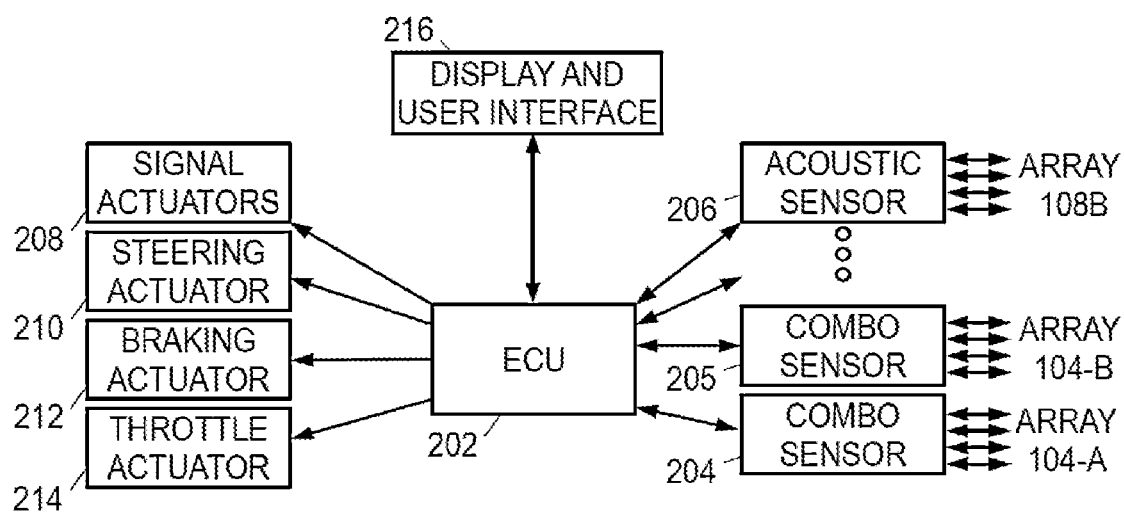
FIG. 2 is a block diagram of an illustrative driver-assistance system.

FIG. 2 shows an electronic control unit (ECU) 202 of a vehicle (e.g., 102) coupled to the various sensors 204-206 as the center of a star topology. Of course, other sensor bus topologies, including serial, parallel, and hierarchical (tree) topologies, are also suitable and contemplated for use in accordance with the principles disclosed herein. The sensors each include an EM transceiver and/or acoustic transceiver which couples to one of the transmit and receive antenna arrays 104A-108B to transmit EM or acoustic waves, receive reflections, and determine a spatial relationship of the vehicle to its surroundings. To provide automated parking, assisted parking, lane following, lane-change assistance, obstacle and blind-spot detection, automatic braking, autonomous driving, and other desirable features, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

To gather EM measurements, the sensors emit EM and/or acoustic waves which travel outward from a set of transmit antennas before being reflected back to a set of receive antennas. The reflector can be any moderately reflective object in the path of the emitted waves. By measuring the travel time of the waves from the transmit antenna to the reflector and back to the receive antenna, the sensors can determine the distance to the reflector. The use of multiple transmit or receive antennas, or the acquisition of multiple measurements at different positions, enables the sensors to determine the direction to the reflector and hence track the location of the reflector relative to the vehicle. With more sophisticated processing, multiple reflectors can be tracked and their relative velocities determined. Both pulsed and continuous-wave measurements can be implemented. In at least some contemplated implementations, the acoustic waves are pulsed and the EM waves are frequency modulated continuous waves.

Figure 3:
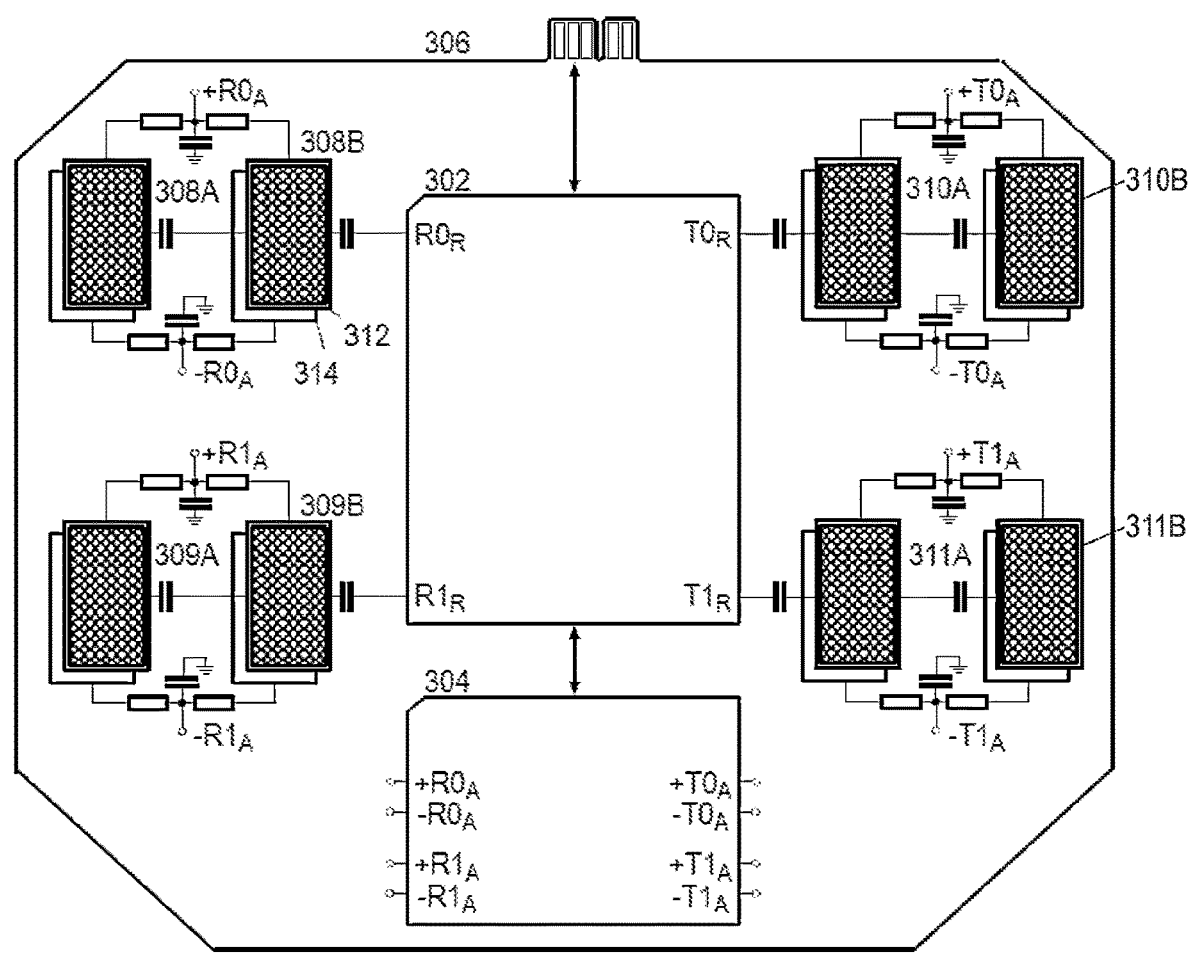
FIG. 3 is a schematic of an illustrative obstacle detection system.

FIG. 3 shows an illustrative obstacle detector including an EMA sensor array. The illustrative detector includes an EM transceiver chip 302 and an acoustic transceiver chip 304 mounted to a printed circuit board (PCB) 306 with multiple EMA sensors 308A, 308B, 309A, 309B, 310A, 310B, 311A, 311B, each of which may be fabricated as an integrated circuit chip.

Each EMA sensor has an EM signal node capacitively coupled to a patch electrode 312, which as explained further below may be implemented as a mesh as shown or implemented as a fully conductive surface. The patch electrode 312 may be driven or sensed relative to a ground plane in the sensor chip or in the PCB 306 to send or receive EM signals. The capacitive coupling is expected to have negligible impedance at the EM signal frequencies, but to block the acoustic signal frequencies, thereby isolating the EM transceiver 302 from the acoustic signals.

Each EMA sensor also has a pair of differential acoustic signal nodes, with one signal node ("+") coupled by a filter to the patch electrode and the complementary signal node ("−") coupled by a filter to a base electrode 314. The filters pass the acoustic signal frequencies while blocking the EM signal frequencies, thereby isolating the acoustic transceiver 304 from the EM signals. The capacitors and filters enable independent and concurrent electronic control of the EM and acoustic aspects of the integrated sensors. For example, sensors 308A and 308B are configured in series for EM sensing, and configured in parallel for acoustic sensing. It is also possible to use a given sensor to transmit EM signals while concurrently receiving acoustic signals, and vice versa.

EMA sensors 308A, 308B are used as a single combined antenna (EM) or transducer (acoustic). EMA sensors 309A, 309B form a second combined sensor, providing multiple inputs to enable MIMO operation of the EM transceiver 302, and to separately enable MIMO operation of the acoustic transceiver 304. EMA antennas/transducers 310A, 310B are coupled to one output of each transceiver, while EMA sensors 311A, 311B are coupled to a second output of each transceiver. For greater directionality, more sensors can be provided for sending and receiving.

Acoustic transceiver 304 may send acoustic pulses and process received acoustic signals to detect echoes, deriving obstacle distances and directions. EM transceiver 302 may transmit frequency modulated continuous wave (FMCW) radar signals and analyze received EM signals to detect reflection energy, deriving obstacle distances and direction. Transceiver 302 may further combine the EM signal-based measurements with the acoustic signal-based measurements, stitching them together to provide obstacle detection over a greater range than can be achieved by either technology alone. Transceiver 302 may further provide an external interface for conveying the measurement information to the ECU.

Though the illustrative implementation of FIG. 3 shows EMA sensors dedicated as transmitters or receivers, this is not a requirement. A given EMA sensor can be used in a bidirectional fashion to transmit and receive. Some contemplated transceiver chips include internal switches or hybrids that enable them to use a given EMA sensor to transmit EM and/or acoustic signals, and to then use that sensor to receive EM and/or acoustic signals. We further note that while a given EMA sensor is being used to transmit EM signals, it may simultaneously be used to receive acoustic signals and vice versa.

Figure 4:
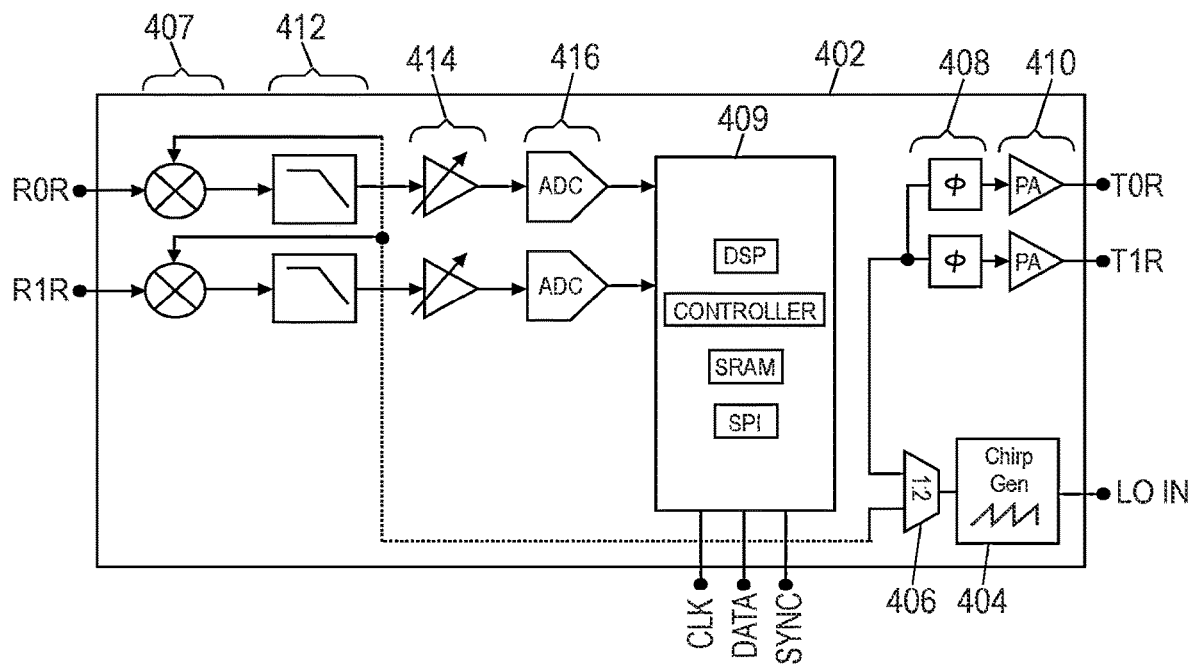
FIG. 4 is a block diagram of an illustrative MIMO radar transceiver chip.

FIG. 4 shows a block diagram of an illustrative EM transceiver chip 402 configured for use in a MIMO radar system. The chip 402 includes a chirp generator 404 that converts a local oscillator signal into a FMCW signal such as a signal with a series of linearly-swept frequency chirps. A power splitter 406 splits off a portion of the FMCW signal power to supply a copy of the FMCW signal to the downconversion mixers 407. The remainder of the FMCW signal passes to a set of phase shifters 408, which the controller 409 uses to phase shift the FMCW signal independently for each of the RF outputs.

The phase shifting can be used in various ways to provide, e.g., coherent beam steering or coding for channel separation that enables virtual beam steering. Channel separation can be provided using orthogonally-coded phase modulation with a different code pattern for each channel. The phase modulation can be 1-bit (bipolar phase shift keying), 2-bit (quadrature phase shift keying), or higher order (N-bit). Power amplifiers 410 take the phase-shifted FMCW signals and drive the contacts for providing transmit signals ($T0_R$ through $T1_R$). The illustrated transceiver provides two transmit signals, but the number can vary.

Transceiver chip 402 further includes contacts for obtaining two receive signals ($R0_R$ through $R1_R$) from receive antennas. Downconversion mixers 407 multiply the receive signals with the copy of the FMCW signal, converting the receive signals to near baseband frequencies that are passed by low pass filters 412. Gain control amplifiers 414 adaptively adjust signal amplitudes to optimize use of the dynamic range of analog-to-digital converters (ADCs) 416. ADCs 416 digitize the receive signals for processing by controller 409. Controller 409 may take the form of a programmable digital signal processor, with fast memory (SRAM) and a serial peripheral interface (SPI), enabling it to communicate with other chips in the system.

Figure 5:
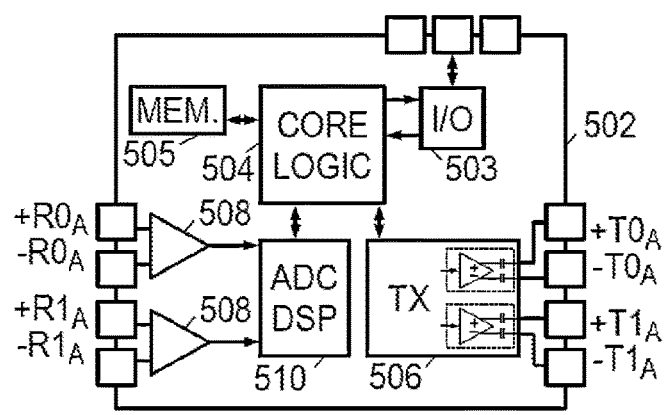
FIG. 5 is a block diagram of an illustrative MIMO acoustic transceiver chip.

FIG. 5 shows a block diagram of an illustrative acoustic transceiver chip 502 configured for use in a MIMO acoustic system. The chip 502 includes an I/O interface for receiving measurement commands and parameters, and for conveying measurements to other chips in the system. Core logic 504 operates in accordance with the firmware and parameters stored in nonvolatile memory 505 to parse commands from the other chips and carry out the appropriate operations, including the transmission and reception of acoustic bursts. To transmit acoustic bursts, core logic 504 is coupled to a transmitter 506 which, with a suitably modulated local oscillator signal from a voltage controlled oscillator, drives one or both sets of transmit terminals $\{+T0_A, -T0_A\}$, $\{+T1_A, -T1_A\}$. The transmitter terminals are coupled to the acoustic inputs of one or more EMA sensors that convert the electrical signals into radiated acoustic energy.

One or more EMA sensors convert echoes of the acoustic bursts into electrical signals that are typically in the millivolt or microvolt range. Low noise amplifiers 508 amplify the signals from the receive terminals. An optional mixer (not shown) multiplies the amplified receive signal with a local oscillator signal to downconvert the modulated signal to baseband before it is digitized and processed by a digital signal processor (DSP) 510 with an integrated analog-to-digital converter (ADC). Alternatively, the receive signals are directly digitized and processed.

DSP 510 applies programmable methods to detect any echoes and measure their parameters such as time-of-flight, duration, and peak amplitude. Such methods may employ threshold comparisons, minimum intervals, peak detections, zero-crossing detection and counting, noise level determinations, and other customizable techniques tailored for improving reliability and accuracy. The DSP 510 may provide the measurement results to core logic 504 for buffering and eventual communication via the external interface. In alternative implementations, the signal processing and sensor fusion may be offloaded to the ECU or other system level processor.

Figure 6A:
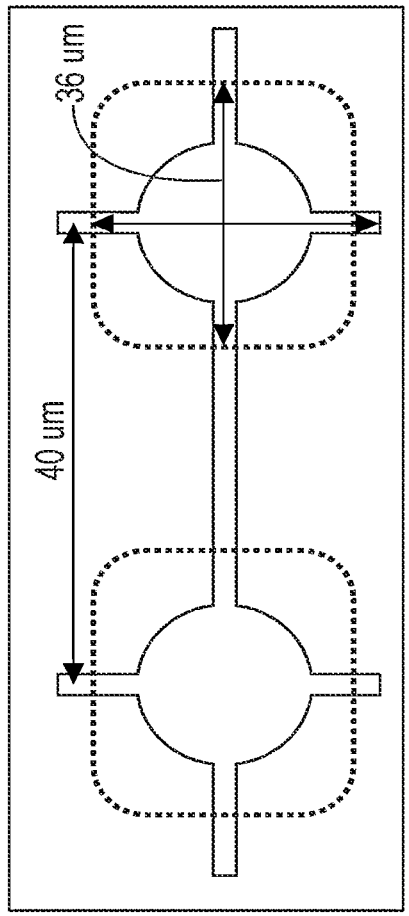
FIGS. 6A-6B are views of an illustrative capacitive micromachined acoustic transducer (derived from O. Oralkan et al., "Capacitive micromachined ultrasonic transducers: next generation acoustic imaging?", IEEE Trans. Ultrasonics, v49 n11, November 2002).
Figure 6B:
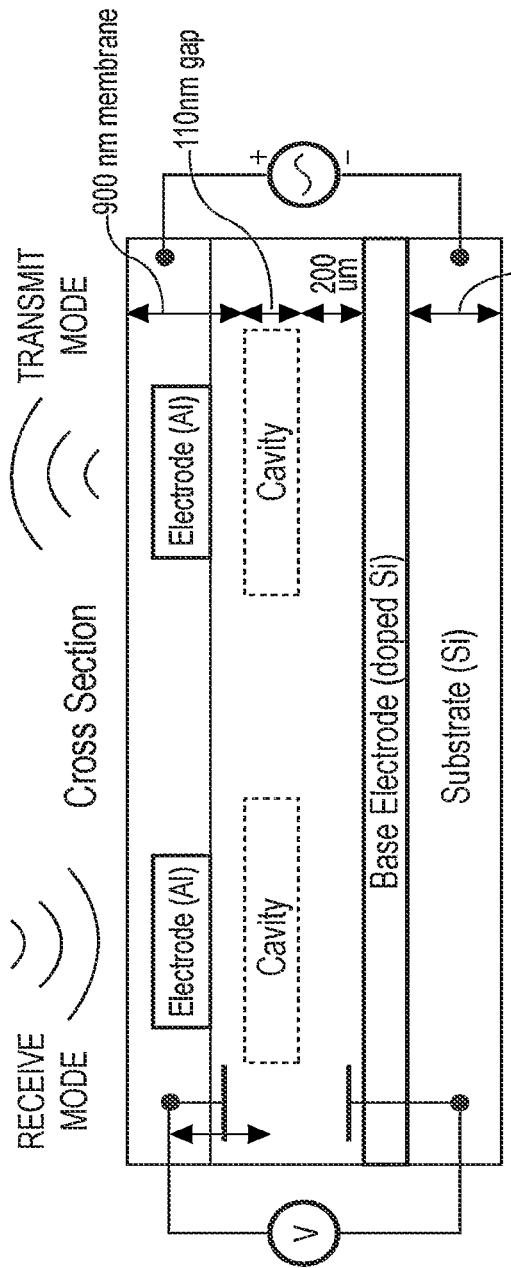

FIGS. 6A and 6B show top and cross-section views of an illustrative capacitive micromachined acoustic transducer. It includes a base electrode formed on a substrate such as a crystalline semiconductor wafer. The substrate thickness can be as little as 100 or 200 microns, but would typically be 500 microns, 700 microns, or more. An insulating layer with embedded cavities is formed over the base electrode. In one contemplated implementation, the embedded cavities are 0.11 microns thick and 36 microns across and 4 microns apart within a 0.2 micron thick insulating layer. A top electrode is provided above each cavity, with interconnections to form a conductive mesh electrode. A passivation layer may be provided to protect the mesh electrode. The total thickness of the membrane above each cavity may be about 0.9 microns, including the passivation layer, mesh electrode, and overlying portion of the insulating layer. Further manufacturing detail can be found in, e.g., O. Oralkan et al., "Capacitive micromachined ultrasonic transducers: next generation acoustic imaging?", IEEE Trans. Ultrasonics, v49 n11, November 2002, which is hereby incorporated herein in its entirety.

When an appropriately biased acoustic signal is applied between the mesh and base electrodes, the membrane above each cavity deforms, converting the electrical signal into radiated acoustic energy. Returning acoustic energy that deforms the membrane above each cavity causes electrical variation of an appropriate voltage bias, thereby converting acoustic energy into an electrical receive signal. Suitable acoustic signal frequencies range from at least 100 kHz to at least 10 MHz, and may potentially range lower (e.g., 10 kHz) and higher (e.g., 100 MHz) with suitably sized cavities.

If the mesh and/or base electrode is formed in the shape of a patch antenna, it can be used to transmit and receive EM signals. However, the separation between the mesh and base electrodes (roughly 1 micron) is a small fraction of the separation desired between a patch antenna and its ground plane (roughly 800 microns, depending on frequency), preventing the use of an unmodified capacitive micromachined acoustic transducer as an EM antenna.

Figure 7A:
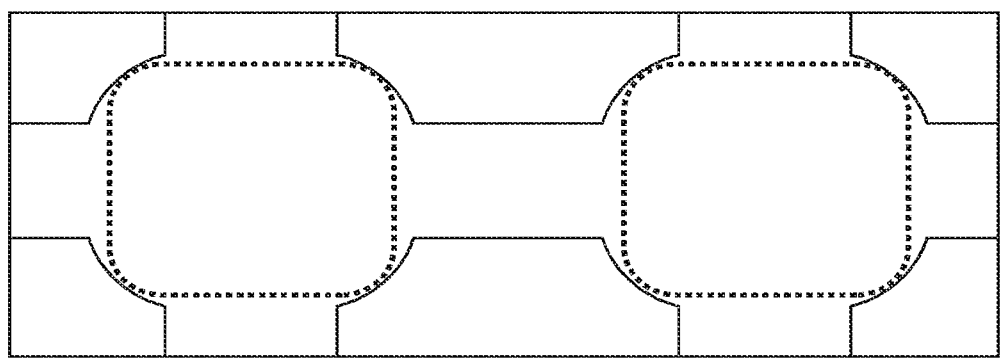
FIGS. 7A-7B are views of an first illustrative integrated electromagnetic-acoustic (EMA) sensor.
Figure 7B:
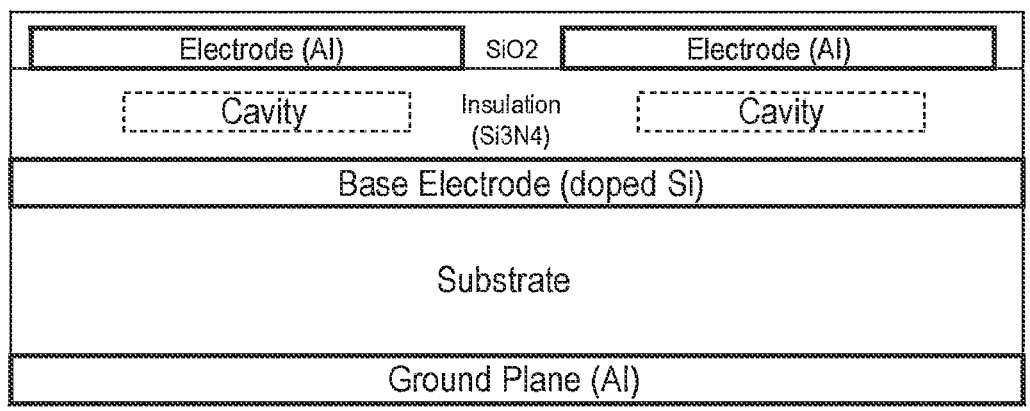
Figure 8A:
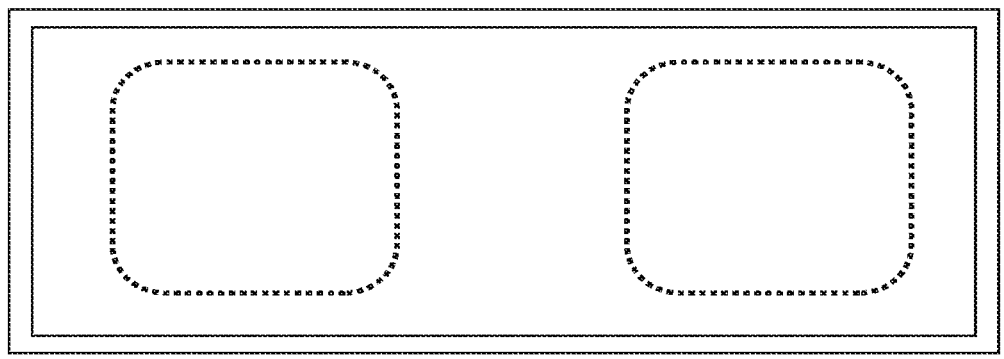
FIGS. 8A-8B are views of a second illustrative EMA sensor.
Figure 8B:
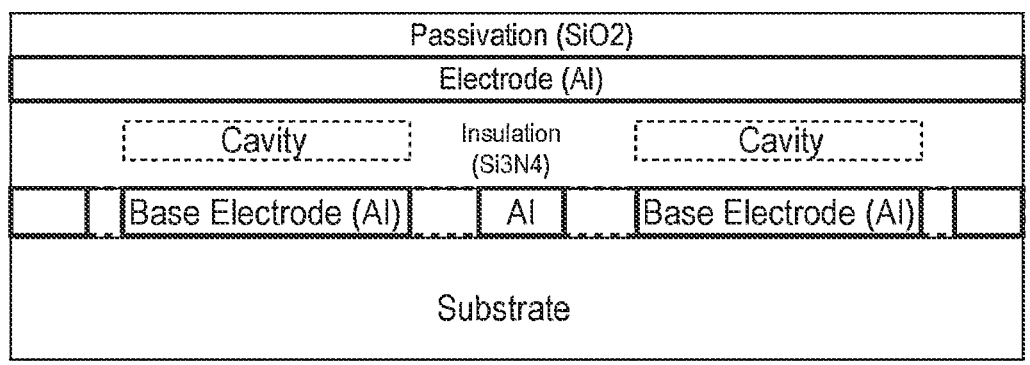

FIGS. 7A and 7B show top and cross-section views of an EMA sensor. The degree of metallization of the mesh electrode may optionally be increased as shown in FIG. 7A to improve performance of mesh electrode as a patch antenna. In at least some contemplated implementation (e.g., FIG. 8A) the mesh electrode is fully metallized (i.e., a solid electrode surface). The comparable Young's modulus of aluminum (74 GPa) and $SiO_2$ (70 GPa) films enables the use of increased metallization without significantly impacting the acoustic performance of the membrane.

FIG. 7B shows the addition of a ground plane on the back surface of the substrate, which may be, e.g., 800 microns thick to provide the desired separation from the patch antenna. Alternatively, the ground plane may be provided on the PCB to which the sensor is mounted. To prevent the base electrode from impacting the performance of the patch antenna, the base electrode may be electrically isolated from EM signal frequencies, enabling it to "float" with respect to the patch electrode. This isolation is discussed further below.

Where it is infeasible to provide the nominal separation between the patch electrode and ground plane (e.g., when using a doped substrate with relative low resistivity), the base electrode may be patterned as a high impedance surface (HIS), using techniques disclosed in academic literature to provide a magnetic wall enabling a "low profile" patch antenna having minimal separation from the ground plane. The base electrode patterning will not affect acoustic performance of the EMA sensors.

Figure 9A:
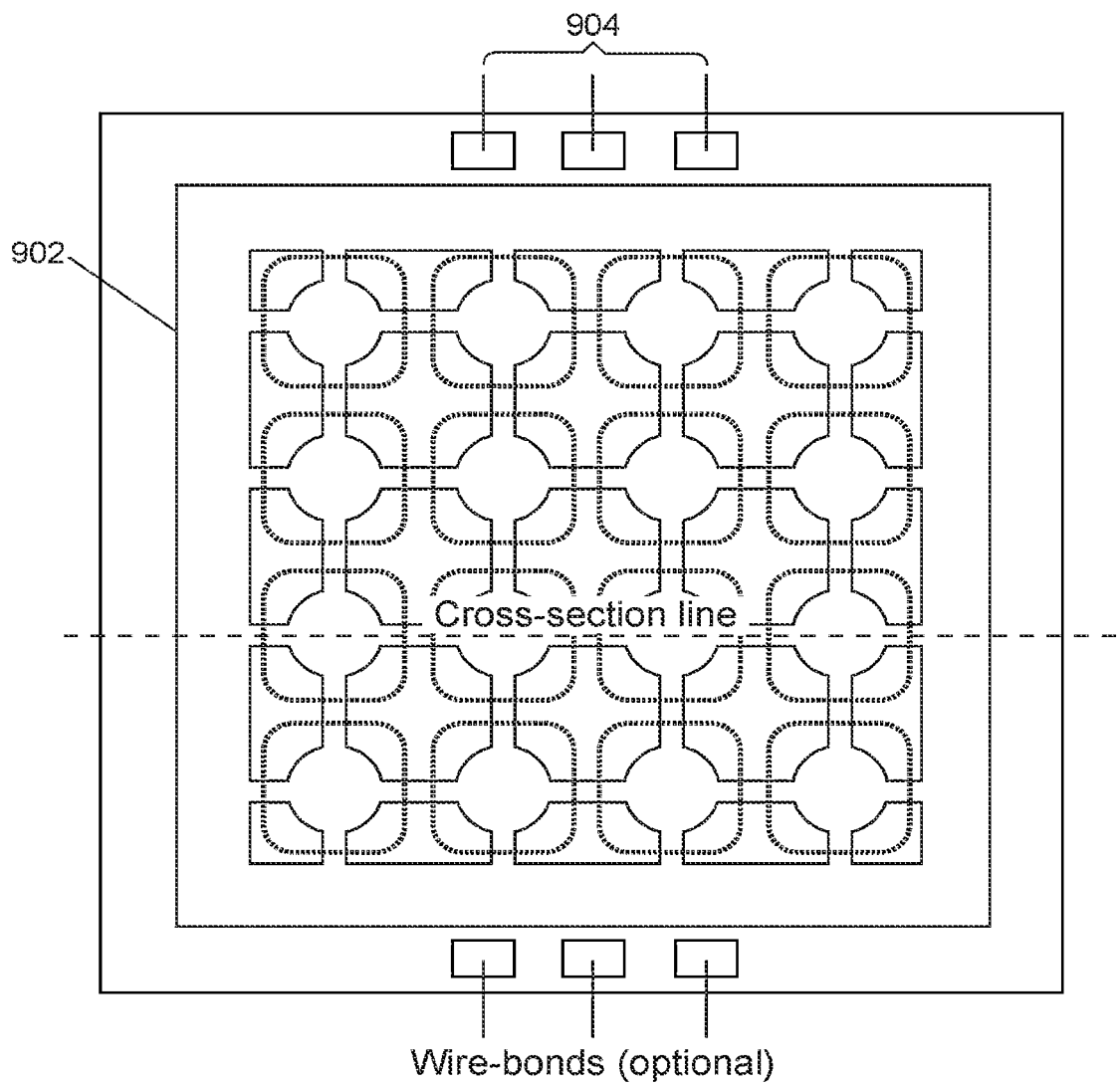
FIGS. 9A-9B are views of an illustrative EMA sensor chip construction.

The acoustic cells of the EMA sensor are small (~40 microns) relative to typical dimensions of a patch antenna configured for automotive radar signals (~1000 microns). Accordingly, a grid of acoustic cells may be arranged within the desired profile of the patch antenna, e.g., a 25×25 cell grid. For ease of illustration, FIG. 9A shows a top view of a chip having a 4×4 grid 902, but it is expected that an EMA sensor chip would include many more acoustic cells. Also shown in FIG. 9A are optional wire bonds for conveying the acoustic signals to the patch and base electrodes. It is not expected to be desirable for the EM signals to be conveyed via wire bond.

Figure 9B:
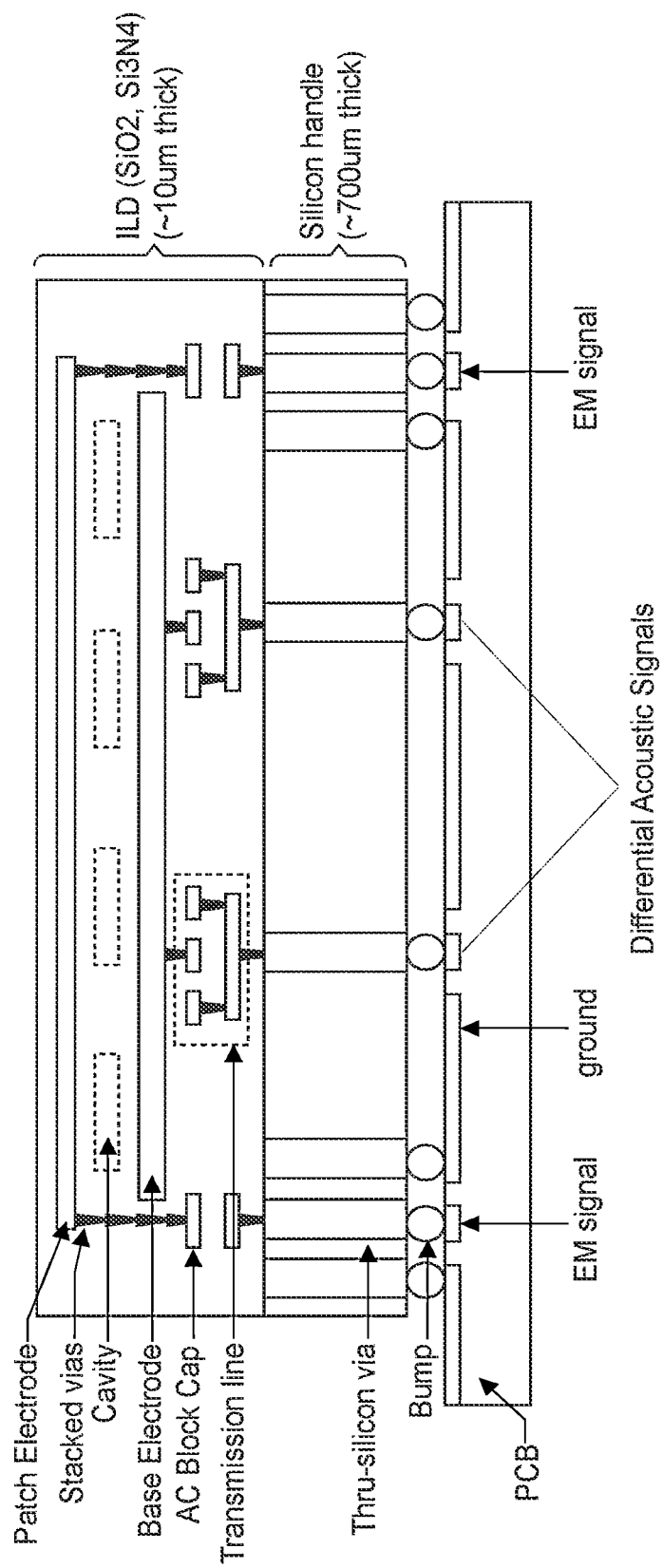

Accordingly, as shown by the cross section view of FIG. 9B, the EM signal may be conveyed to the patch electrode via ball grid array contacts on the bottom surface of the substrate. Through-silicon vias may convey the EM signals to the patch electrode (with an optional "cage" of surrounding vias to limit electromagnetic interference). FIG. 9B shows integrated coupling capacitors ("AC block cap") sized to pass EM signal frequencies while blocking acoustic signal frequencies. FIG. 9B further shows integrated quarter-wave transmission lines to configured to pass acoustic signal frequencies while blocking EM signal frequencies (in cooperation with on-chip or off-chip capacitors). In the implementation of FIG. 9B, the ground plane is provided on the PCB.

Figure 10:
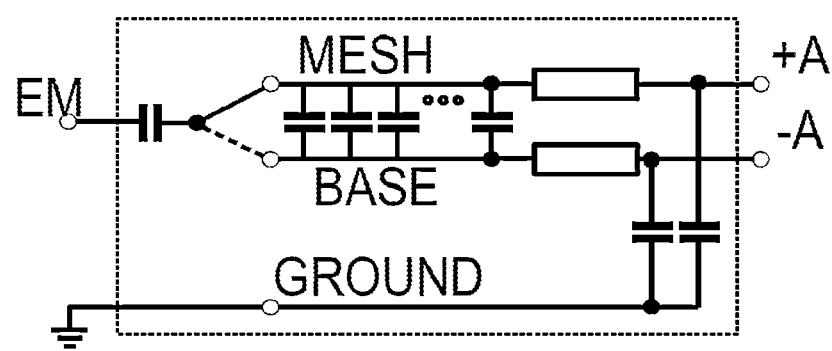
FIG. 10 is a schematic of an illustrative EMA sensor chip.

FIG. 10 is a schematic of the EMA sensor, showing a ground plane, an EM signal node, and a pair of differential acoustic signal nodes. The EM node is coupled to the mesh electrode by a capacitor that passes EM signal frequencies while blocking acoustic signal frequencies. In this configuration, the mesh electrode serves as the patch antenna. Alternatively, the base electrode may serve as the patch antenna. The mesh electrode is coupled to one of the differential acoustic signal nodes by an RF choke, such as a quarter-wave transmission line or an inductor. The base electrode is similarly coupled to the other differential acoustic signal node. Capacitors couple the differential acoustic signal nodes to ground, cooperating with the RF choke to provide a filter that blocks the EM signal frequencies while passing acoustic signal frequencies.

Figure 11A:
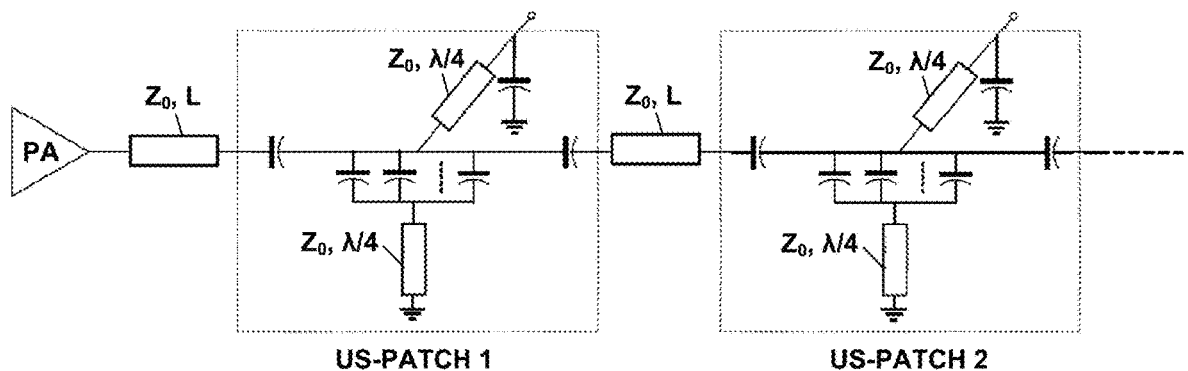
FIG. 11A is a schematic of an illustrative EMA sensor array.

Many patch antenna designs employ multiple patches for increased directivity. FIG. 11A is a schematic of EMA sensors arranged in series with intermediate transmission line segments of characteristic impedance $Z_0$ and whatever lengths L may be required by the given design. Capacitors may be provided to prevent Acoustic signal frequencies from entering or exiting via the transmission line segments. Within each EMA sensor, an acoustic signal node is coupled to ground via a capacitor and coupled to the mesh node via an RF choke, which cooperates with the capacitor to pass acoustic signal frequencies while blocking EM signal frequencies from entering or exiting via the acoustic signal node. In the implementation of FIG. 11A, the base electrode is coupled to ground by an RF choke that blocks EM signal frequencies. A series of capacitors between the mesh and base electrodes represent the array of acoustic cavity cells.

Figure 11B:
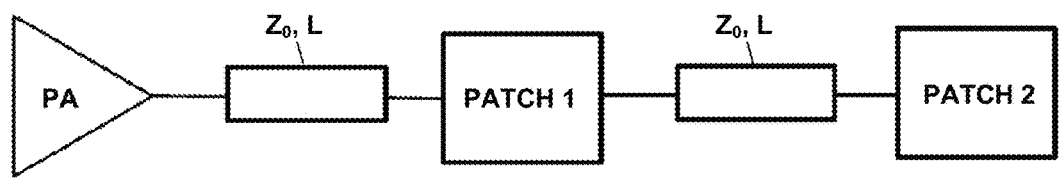
FIG. 11B is an equivalent circuit schematic at EM signal frequencies.
Figure 11C:
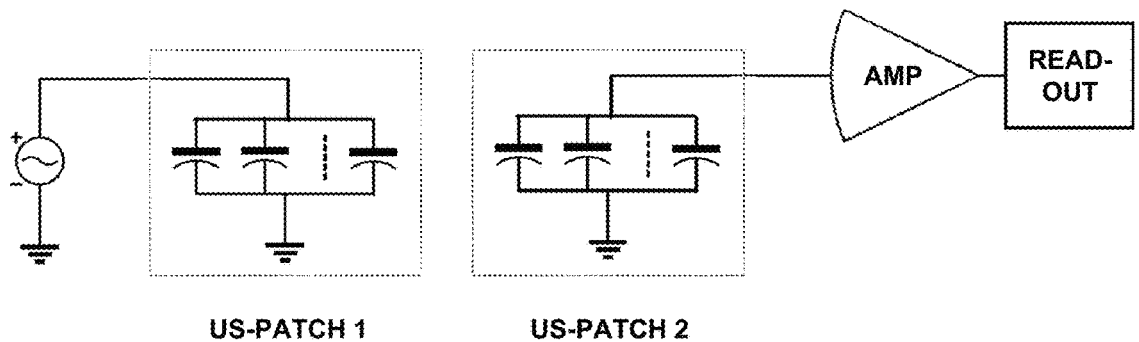
FIG. 11C is an equivalent circuit schematic at acoustic signal frequencies.

At EM signal frequencies, the equivalent circuit is that shown in FIG. 11B, i.e., an amplifier driving a series arrangement of patches interconnected by transmission line segments. At acoustic signal frequencies, the equivalent circuit is that shown in FIG. 11C, with one of the EMA sensors being driven by an acoustic signal to transmit acoustic bursts, and another of the EMA sensors being coupled to an amplifier to detect receive signal variations indicative of acoustic burst echoes.

Figure 12A:
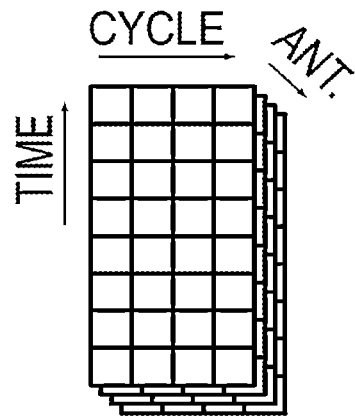
FIGS. 12A and 12B are illustrative data cubes representing an acquired set of radar measurements and a transformed set of radar measurements, respectively.

FIG. 12A shows an illustrative data cube representing a portion of the digital signal measurements that may be collected by EM transceiver 302. Each chirp may be considered as a measurement cycle. During a measurement cycle, the front end digitizes the down-converted receive signals from the receive antennas, thereby providing a time-sequence of digitized receive signal samples. Due to the chirp modulation, the signal energy reflected by the targets reaches the receive antennas with a frequency offset that depends on the round-trip travel time (and hence on the distance to the target). A Fast Fourier Transform (FFT) of the time sequence collected in a given cycle will isolate the energy associated with each frequency offset, yielding a function of reflected energy versus target range. This operation, which may be referred to herein as the "range FFT", may be performed for each transmit-receive antenna pair in each measurement cycle. The range FFT yields peaks for each target having a given range.

Motion of the target relative to the antenna array adds a Doppler shift to the reflected signal energy, the Doppler shift being essentially proportional to the relative velocity. Though it is usually small relative to the range-induced frequency offset, it is nevertheless observable as a change in the phase of the associated frequency coefficients in subsequent measurement cycles. (Recall that FFT coefficients are complex-valued, having both magnitude and phase.) Applying an FFT to the corresponding frequency coefficients in a sequence of measurement cycles will isolate the energy associated with each relative velocity, yielding a function of reflected energy versus target velocity. This operation, which may be referred to herein as the "velocity FFT", may be performed for each range and each tx-rx antenna pair. The resulting two-dimensional data array possesses "peaks" for each target having a given range and relative velocity.

The reflected energy from a given target reaches the individual receive antennas in the antenna array with a relative phase that depends on the direction of arrival of the reflected energy (aka "angle of approach"). Applying an FFT to corresponding frequency coefficients associated with a sequence of uniformly spaced antennas will isolate the energy associated with each incidence angle, yielding a function of reflected energy versus angle of approach ("AoA"). This operation, which may be referred to herein as the "AoA FFT", may be performed for each range and velocity using a given transmit antenna.

Figure 12B:
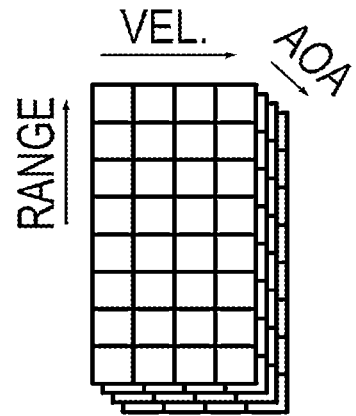

Thus, digitized signal measurements arranged in a measurement data cube having its three dimensions representing functions of time, measurement cycle, and antenna position (as shown in FIG. 12A), can be transformed into a target data cube having its three dimensions representing functions of range, velocity, and AoA (as shown in FIG. 12B). As these operations (channel separation, range FFT, velocity FFT, and AoA FFT) are linear, they can be performed in any order. Further, the FFT operations are independent (meaning that, e.g., the range FFT for a given antenna and cycle is independent of the range FFTs for other antennas and other cycles, and the velocity FFT for a given range and antenna is independent of the velocity FFTs for other ranges and antennas) enabling the FFT processing to be parallelized if desired.

Another desirable processing operation is the separation of signal energy from noise energy. Any suitable noise suppression or target detection technique may be used. One popular technique (which includes many variants) is that of constant false alarm rate (CFAR) detection. CFAR detection employs detection threshold adaptation based on measurement energy values in a sliding window near or around the measurement being evaluated (aka "cell under test"). The original technique and its variations offer various tradeoffs between performance and computational complexity by using different statistical approaches to deriving the detection threshold from the measurements within the sliding window. CFAR detection is a non-linear technique because the measurements values below the threshold are zeroed or ignored, but its position in the processing sequence may nevertheless be modified because the zeroing of frequency coefficients generally will not prevent subsequent FFTs from exploiting the relevant phase/frequency information of energy peaks representing targets.

Figure 13:
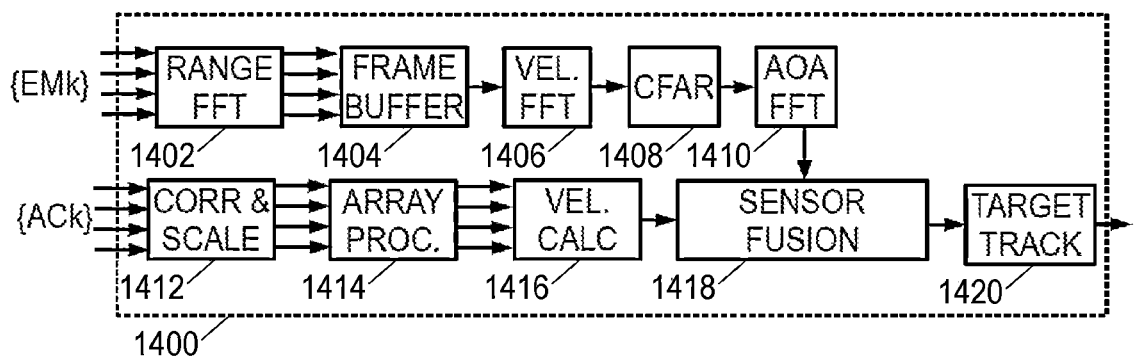
FIG. 13 is a data flow diagram for an illustrative obstacle detection system.

FIG. 13 shows an illustrative data flow 1400 that may be implemented by the transceiver chips alone or in combination with a system level processor such as the ECU. As the digitized receive signals $EM_k$ are obtained, range FFTs 1402 are performed for each channel essentially as the signals are acquired, storing the resulting frequency coefficients as range data in a frame buffer 1404. The frame buffer 1404 accumulates range data from multiple measurement cycles, enabling the controller 409 to then perform velocity FFTs 1406 to produce target range and velocity data for each channel as discussed previously.

A CFAR detector 1408 operates on the target range and velocity data to remove noise energy below the adaptive threshold. The CFAR detector 1408 may zero the below-threshold values, leaving only the above-threshold values as representing range and velocity of potential targets (radar energy reflectors). In certain contemplated variations, the CFAR detection process compresses the volume of data by omitting at least some of the below-threshold values, and by perhaps employing a more sophisticated data compression technique to reduce buffer size requirements and/or bus bandwidth requirements. The controller 409 may further perform AoA FFTs 1410 to determine the relative directions associated with potential targets.

As the digitized acoustic signals $AC_k$ are obtained from each acoustically-receiving EMA sensor, the DSP 510 applies a correlation filter and scales the output to compensate for distance-related attenuation. The DSP may further perform array processing 1414 to identify peaks and to determine distance and direction of associated obstacles, and may optionally track obstacles over time to perform velocity calculation 1416. The controller 409 or a system-level processor 202 may perform sensor fusion processing to stitch together the short-range acoustic signal measurements with the longer-range EM signal measurements. Target detection and tracking may be performed by the system level processor to evaluate targets, determine whether any responsive action is needed, and to optionally perform the responsive actions automatically.

Figure 14:
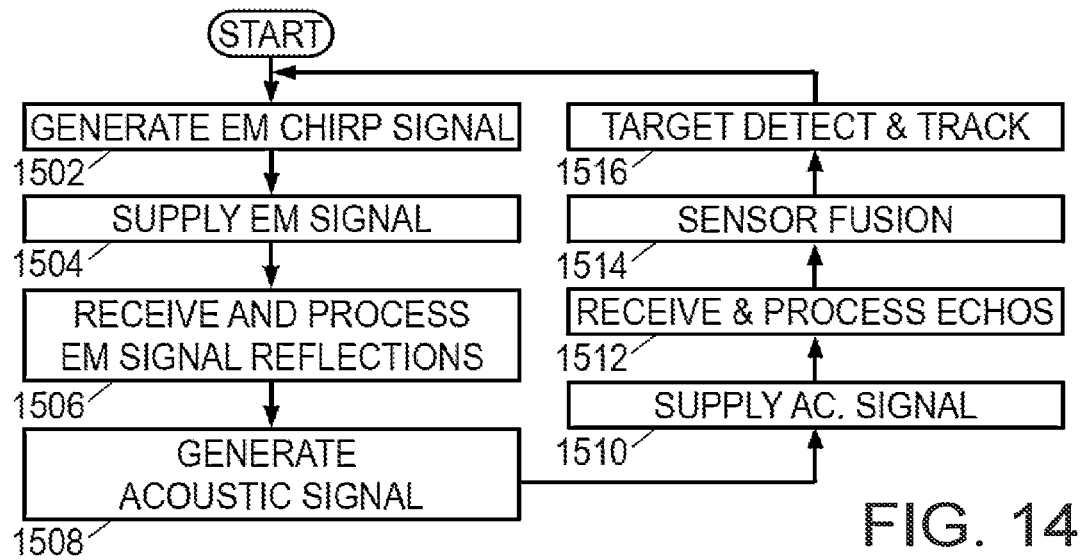
FIG. 14 is a flow chart of an illustrative obstacle detection method.

FIG. 14 is a flow chart of an illustrative obstacle detection method implementable by a MIMO EMA sensor system. It begins in block 1502 using a chirp generator 404 to generate a chirp signal having intervals where the signal frequency ramps linearly from a start frequency to an end frequency. The chirp signal can be an upward-chirp, a downward chirp, or even a triangular up-then-down chirp signal. The chirp signal is split into multiple transmit signals, and in block 1504, supplied to the selected EMA transmit sensors. In block 1506, the EM receive signals are obtained from the selected EMA receive sensors and processed to determine reflected signal energy as a function of at least distance and direction. In block 1508, a transmitter 506 generates acoustic signals and in block 1510 supplies them to the selected EMA transmit sensors. In block 1512, the acoustic receive signals are obtained from the selected EMA receive sensors and processed to determine reflected signal energy as a function of at least distance and direction. In block 1514, the short-range acoustic energy measurements are combined with the longer-range EM signal measurements to determine a map of reflected signal energy versus distance and direction. In block 1516, a processor applies target detection and tracking, and may further analyze the targets to determine whether responsive action is needed and if so to initiate the responsive action.

Though the operations in FIG. 14 have been described in a sequential fashion for explanatory purposes, the various operations may in practice be implemented in a concurrent or pipelined fashion. Moreover, the operations may be re-ordered or performed asynchronously in some implementations.

Numerous other modifications, equivalents, and alternatives, will become apparent to those of ordinary skill in the art once the above disclosure is fully appreciated. It is intended that the following claims be interpreted to embrace all such modifications, equivalents, and alternatives where applicable.

What is claimed is:

1. An obstacle detector, comprising:
   a radar transceiver configured to transmit an electromagnetic (EM) transmit signal to an EM input of a first EM-acoustic sensor and configured to obtain an EM receive signal from an EM output of a second EM-acoustic sensor; and
   an acoustic transceiver configured to provide an acoustic transmit signal to an acoustic input of the first EM-acoustic sensor and configured to obtain an acoustic receive signal from an acoustic output of the second EM-acoustic sensor;
   wherein the obstacle detector is configured to combine an EM baseband or EM intermediate frequency (IF) signal corresponding to the EM receive signal and an acoustic baseband or acoustic IF signal corresponding to the acoustic receive signal, and to determine a distance to an obstacle based at least in part on the combination; and wherein the obstacle detector comprises a filter coupled to the acoustic input and configured to pass the acoustic transmit signal and to block the EM transmit signal.

2. The obstacle detector of claim 1, wherein the obstacle detector comprises a controller, coupled to the radar transceiver and the acoustic transceiver, configured to combine the EM baseband or EM IF signal and the acoustic baseband or acoustic IF signal, and to determine the distance.

3. The obstacle detector of claim 1, wherein the first EM-acoustic sensor is different from the second EM-acoustic sensor.

4. The obstacle detector of claim 1, wherein the acoustic transmit signal or the acoustic receive signal have frequencies between 100 kHz-10 MHz.

5. The obstacle detector of claim 1, wherein an acoustic range of the acoustic transmit signal and the acoustic receive signal comprises shorter distances than a radar range of the EM transmit signal and the EM receive signal.

6. The obstacle detector of claim 5, wherein a detection range of the obstacle detector is greater than the acoustic range or the radar range.

7. The obstacle detector of claim 1, wherein the EM transmit signal comprises a frequency-modulated continuous wave signal and the acoustic transmit signal comprises acoustic pulses.

8. The obstacle detector of claim 1, wherein the obstacle detector is configured to concurrently perform acoustic measurements and radar measurements.

9. The obstacle detector of claim 1, wherein the obstacle detector comprises a radar antenna capacitively coupled to the radar transceiver, and the capacitive coupling is configured to pass the EM transmit signal and the EM receive signal, and to block the acoustic transmit signal and the acoustic receive signal.

10. The obstacle detector of claim 1, wherein the acoustic transmit signal or the acoustic receive signal have frequencies between 10 kHz-100 MHz.

11. The obstacle detector of claim 1, wherein the first EM-acoustic sensor and the second EM-acoustic sensor are coupled in series for radar measurements and are coupled in parallel for acoustic measurements.

12. The obstacle detector of claim 1, wherein the obstacle detector comprises a patch antenna; and wherein the patch antenna comprises an array of capacitive micromachined acoustic transducers.

13. A vehicle comprising an obstacle array detector, wherein the obstacle detector comprises:

a radar transceiver configured to transmit an electromagnetic (EM) transmit signal to an EM input of a first EM-acoustic sensor and configured to obtain an EM receive signal from an EM output of a second EM-acoustic sensor; and an acoustic transceiver configured to provide an acoustic transmit signal to an acoustic input of the first EM-acoustic sensor and configured to obtain an acoustic receive signal from an acoustic output of the second EM-acoustic sensor;

wherein the obstacle detector is configured to combine an EM baseband or EM intermediate frequency (IF) signal corresponding to the EM receive signal and an acoustic baseband or acoustic IF signal corresponding to the acoustic receive signal, and to determine a distance to an obstacle based at least in part on the combination; and wherein the obstacle detector comprises a filter coupled to the acoustic input and configured to pass the acoustic transmit signal and to block the EM transmit signal.

14. The vehicle of claim 13, wherein the obstacle detector comprises a controller, coupled to the radar transceiver and the acoustic transceiver, configured to combine the EM baseband or EM IF signal and the acoustic baseband or acoustic IF signal, and to determine the distance.

15. The vehicle of claim 13, wherein the first EM-acoustic sensor is different from the second EM-acoustic sensor.

16. The vehicle of claim 13, wherein an acoustic range of the acoustic transmit signal and acoustic receive signal comprises shorter distances than a radar range of the EM transmit signal and the EM receive signal.

17. A method for detecting an obstacle, the method comprising:

by an obstacle detector having a filter coupled to the acoustic input and configured to pass the acoustic transmit signal and to block the EM transmit signal:
transmitting an electromagnetic (EM) transmit signal;
receiving an EM receive signal;
providing an acoustic transmit signal;
receiving, using the filter, an acoustic receive signal;
converting the EM receive signal to an EM baseband or EM intermediate frequency (IF) signal and converting the acoustic receive signal to an acoustic baseband or acoustic IF signal;
combining the EM baseband or EM IF signal and the acoustic baseband or acoustic IF signal; and
determining a distance to the obstacle based at least in part on the combination.

18. The method of claim 17, wherein an acoustic range of the acoustic transmit signal and the acoustic receive signal comprises shorter distances than a radar range of the EM transmit signal and the EM receive signal.

19. The method of claim 18, wherein a detection range of the obstacle detector is greater than the acoustic range or the radar range.

20. The method of claim 17, wherein the obstacle detector concurrently performs acoustic measurements and radar measurements.

* * * * *